US005657188A

United States Patent [19]
Jurgenson et al.

[11] Patent Number: 5,657,188
[45] Date of Patent: Aug. 12, 1997

[54] HEAD SUSPENSION WITH TRACKING MICROACTUATOR

[75] Inventors: Ryan A. Jurgenson, Hutchinson; Lloyd C. Goss, Silver Lake, both of Minn.

[73] Assignee: Hutchinson Technology Incorporated, Hutchinson, Minn.

[21] Appl. No.: 457,432

[22] Filed: Jun. 1, 1995

[51] Int. Cl.⁶ .............................. G11B 5/55; G11B 5/56; G11B 21/24
[52] U.S. Cl. .......................................... 360/106; 360/109
[58] Field of Search ................................ 360/109, 104, 360/106

[56] References Cited

U.S. PATENT DOCUMENTS

| 4,858,040 | 8/1989 | Hazebrouck | 360/78.05 |
|---|---|---|---|
| 5,216,559 | 6/1993 | Springer | 360/106 |
| 5,303,105 | 4/1994 | Jorgenson | 360/106 |
| 5,359,474 | 10/1994 | Riederer | 360/78.05 |
| 5,367,420 | 11/1994 | Yagi | 360/109 |
| 5,400,192 | 3/1995 | Mizoshita et al. | 360/77.16 |
| 5,408,376 | 4/1995 | Nishikura et al. | 360/109 |
| 5,438,469 | 8/1995 | Rudi | 360/109 |
| 5,521,778 | 5/1996 | Boutaghou | 360/106 |

FOREIGN PATENT DOCUMENTS

| 0 549 814 A1 | 7/1993 | European Pat. Off. . |
| 7-201148 | 8/1994 | Japan . |
| WO93/02451 | 2/1993 | WIPO . |

OTHER PUBLICATIONS

Tang, et al., "Silicon Micromachined Electromagnetic Microactuators For Rigid Disk Drives," submitted for presentation at the Intermag Conference Apr. 1995, 2 pages.
Tang, et al., "Design, Fabrication and Testing of Micromachined Electromagnetic Microactuators for Rigid Disk Drives," submitted for presentation at the Transducer '95 Conference, Apr. 1995, 2 pages.
Temesvary, et al., "Design, Fabrication and Testing of Silicon Microgimbals for Super–Compact Rigid Disk Drives", IEEE/ASME J. of MEMS, Dec. 1994, pp.1–26.
Miu, et al., "Silicon Microgimbals for Super–Compact Magnetic Recording Rigid Disk Drives," Adv. Info. Storage Syst., vol. 5, 1993, pp. 139–152.
Wu, et al., "Silicon Micromachined Integrated Suspension Systems for 30% Read/Write Pico–Sliders,", submitted for publication in the ASME Journal of Vibration & Acoustics, pp. 1–13, undated.
O'Connor "Microengines go for a spin," Mechanical Engineering, Feb. 1995, p. 66.
O'Connor, "Miniature motors for future PCs," Mechanical Engineering, Feb. 1995, pp. 63–65.
Miu, et al., "Silicon Micromachined Scaled Technology," 1993 JSME International Conference on Advanced Mechatronics, Tokyo, Japan, Aug. 1993, pp. 527–532.
Mori, et al., "A Dual–Stage Magnetic Disk Drive Actuator Using A Piezoelectric Device for a High Track Density," IEEE Transactions on Magnetics, Nov. 1991, vol. 27, No. 6, pp. 5298–5300.
Miu, et al., "Silicon Microstructures and Microactuators for Compact Computer Disk Drives," IEEE Control Systems, Dec. 1994, pp. 52–57.
"Microactuator–related materials published at a National Storage Industry Consortium (NSIC) meeting", 18 pages.

*Primary Examiner*—A. J. Heinz
*Attorney, Agent, or Firm*—Faegre & Benson LLP

[57] ABSTRACT

A disk drive suspension including a load beam having a rigid region, a base on a proximal end of the load beam and a flexure for receiving and supporting a read/write head on the distal end of the load beam. A microactuator on the load beam moves the flexure and read/write head about a tracking axis with respect to the rigid region. The microactuator includes a moving pole member mounted to the flexure, a stationary pole member mounted to the rigid region of the load beam adjacent to the moving pole, and coils around the stationary pole member.

18 Claims, 9 Drawing Sheets

HEAD SUSPENSION WITH TRACKING MICROACTUATOR

BACKGROUND OF THE INVENTION

1. Field of the Invention

The present invention relates generally to suspensions for supporting read/write heads over recording media. In particular, the present invention is head suspension assembly with a tracking microactuator.

2. Description of the Related Art

Magnetic disk drives include suspensions for supporting magnetic read/write heads over information tracks of rotating disks. The well known and widely used Watrous-type suspensions include a load beam having a baseplate on a proximal end, a flexure on a distal end, a relatively rigid region adjacent to the flexure and a spring region between the baseplate and rigid region. An air-bearing slider which includes the magnetic head is mounted to the flexure. The baseplate of the suspension is mounted to an actuator arm. A motor which is controlled by a servo control system rotates the actuator arm to position the magnetic head over desired information tracks on the magnetic disk.

Disk drive manufacturers continue to develop smaller yet higher storage capacity drives. Storage capacity increases are achieved in part by increasing the density of the information tracks on the magnetic disks (i.e., by using narrower and/or more closely spaced tracks). As track density increases, however, it becomes increasingly difficult for the motor and servo control system to quickly and accurately position the magnetic head over the desired servo track.

The use of microactuators or fine tracking motors has been proposed to overcome these problems. One such microactuator is disclosed in the Denny K. Miu et al. article, *Silicon Microstructures and Microactuators for Compact Computer Disk Drives*, IEEE Control Systems (December, 1994). This microactuator is machined from silicon and is positioned between the flexure and slider.

There is, however, a continuing need for improved microactuators. In particular, the microactuator must be capable of quickly and accurately positioning the magnetic head. The microactuator should be lightweight to minimize detrimental effects on the resonance characteristics of the suspension, and relatively thin to enable close disk-to-disk spacing. To be commercially viable the microactuator must also be reliable and capable of being efficiently manufactured.

SUMMARY OF THE INVENTION

The present invention is a suspension which includes a lightweight, low-profile and efficient-to-manufacture tracking microactuator. One embodiment of the suspension includes a load beam having a rigid region and proximal and distal ends. The proximal end of the load beam includes a base. A flexure configured for receiving and supporting a read/write head is located on the distal end of the load beam. A microactuator on the load beam moves the flexure along a tracking axis with respect to the rigid region.

The microactuator can be an electromagnetic device including a moving pole member on the flexure and a pair of coils mounted to the rigid region of the load beam adjacent to the moving pole member. The coils create electromagnetic forces which act on the moving pole member to move the flexure along the tracking axis. One embodiment of the suspension includes a T-type flexure having a tongue. In this embodiment the moving pole member of the microactuator can be mounted to the free end of the tongue.

Another embodiment of the suspension includes a gimbal-type flexure having a gimbal suspended from the load beam by arms. In this embodiment the moving pole member of the microactuator is mounted to one of the gimbal arms.

DETAILED DESCRIPTION OF THE PREFERRED EMBODIMENTS

Figure 1:
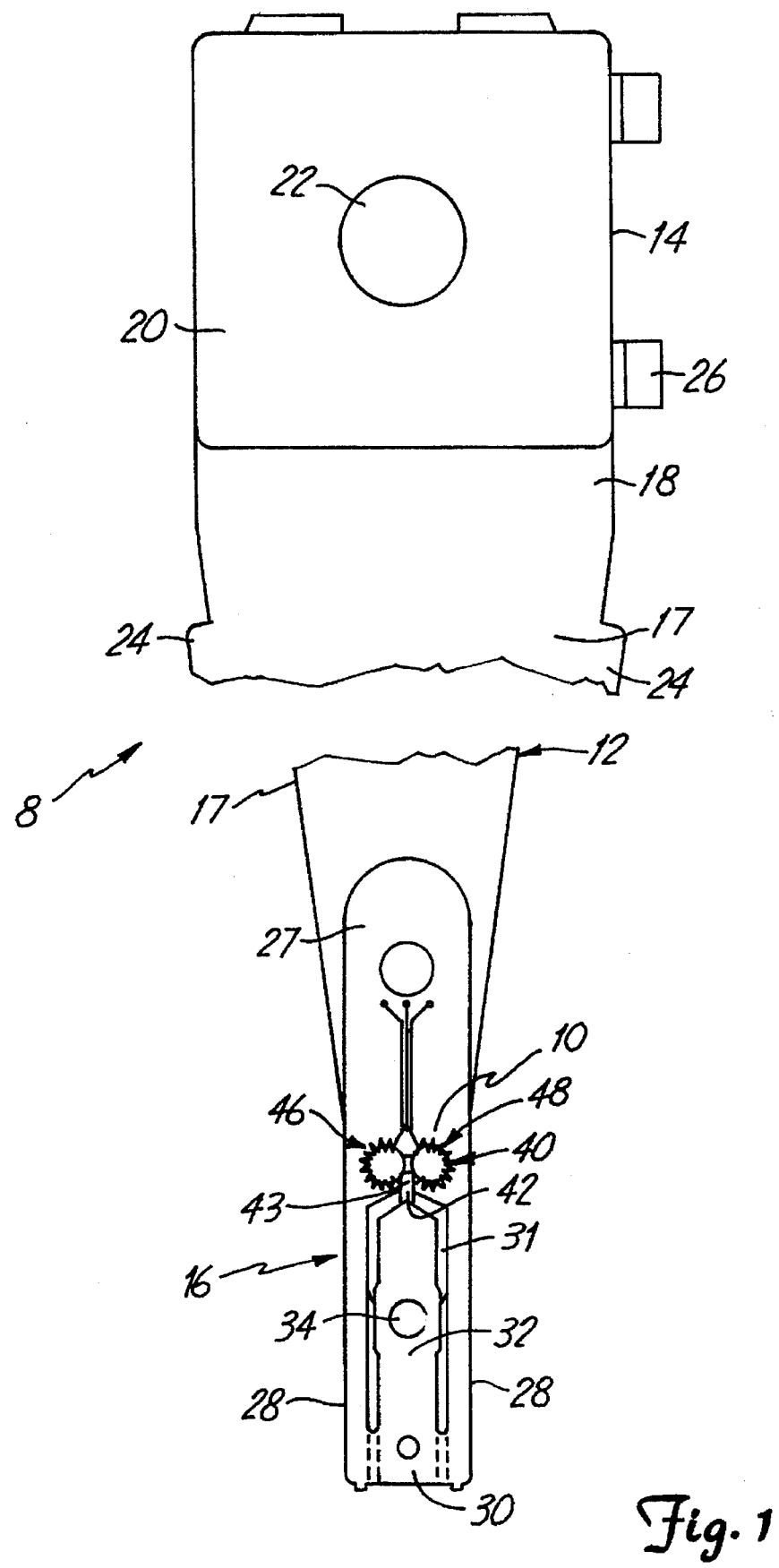
FIG. 1 is a top view of a suspension with a separately fabricated T-flexure including a tracking microactuator in accordance with the present invention.

A head suspension 8 which includes a tracking microactuator 10 in accordance with the present invention is illustrated generally in FIG. 1. As shown, suspension 8 includes a load beam 12 having a base 14 on a proximal end, a T-type flexure 16 on a distal end, a relatively rigid region 17 adjacent to the flexure, and a radius or spring region 18 between the base and rigid region. A baseplate 20 is welded to base 14 and includes a swageblock 22 for mounting the suspension 8 to a disk drive actuator arm (not shown in FIG. 1). A pair of channel rails 24 are formed in the opposite sides of the load beam 12 along the length of the rigid region 17. Tabs 26 which extend from rails 24 and base 14 are used to position and support read/write head lead wires (not shown). Load beam 12 can be fabricated and formed from a sheet of stainless steel or other resilient material in a conventional manner.

In the embodiment shown, flexure 16 is fabricated and formed separately from load beam 12, and is welded or otherwise mounted to the load beam during the manufacture of suspension 8. This flexure 16 includes a mounting portion 27, a pair of spaced arms 28 which extend from the mounting portion, and a cross member 30 which extends between the distal ends of the arms. The arms 28 and cross member 30 form a gap 31 through the distal end of flexure 16. A tongue 32 extends from the cross member 30 into gap 31 toward load beam base 14. Cross member 30 is offset from arms 28 so the plane of the cross member and tongue 32 are offset from the plane of the arms. Tongue 32 also includes a conventional load point dimple 34. Although not shown in FIG. 1, a slider with a magnetic read/write head will be adhesively bonded or otherwise mounted to tongue 32 to form a head gimbal assembly from suspension 8.

Microactuator 10 can be described in greater detail with reference to FIGS. 1–4. In the embodiment shown, microactuator 10 is an electromagnetic device including magnetic field-generating structure 40 and moving pole member 42. Moving pole member 42 is mounted to and extends from tongue 32, and includes a free end 43. Pole member 42 is fabricated from NiFe or other relatively high permeability magnetic material. Although not visible in FIGS. 1–4, a spacing member can be located between moving pole member 42 and the portion of the tongue 32 to which the pole member is mounted to position the moving member of the same relative height as the stationary pole member (described below) of field-generating structure 40. The spacing member can be formed from polyimide or other materials.

Figure 2:
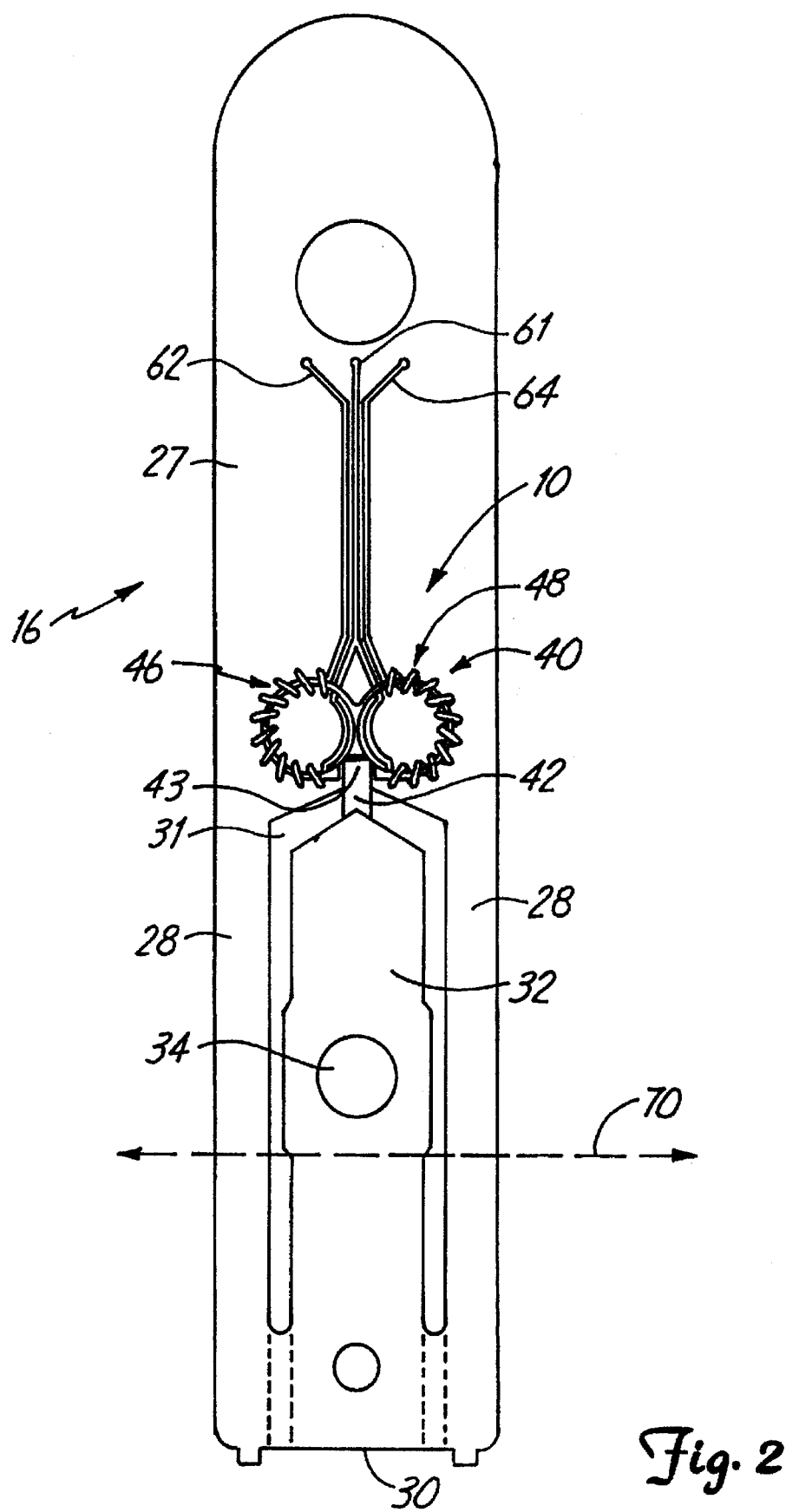
FIG. 2 is a detailed view of the flexure shown in FIG. 1.

Field-generating structure 40 is fixedly mounted with respect to the rigid region 17 of load beam 12, and is fabricated on the flexure 16 in the embodiment shown in FIGS. 1 and 2. Structure 40 includes a fixed or stationary pole member 44 and a pair of coils 46 and 48. Pole member 44 is a sideways generally "3"-shaped member fabricated from NiFe or other relatively high permeability magnetic material, and has a pair of semicircular sections 50 and 52 which terminate at central end 56 and side ends 54 and 58. The ends 54, 56 and 58 of pole member 44 form a gap 60 that surrounds the three edges of the free end 43 of moving pole member 42. Coils 46 and 48 include a plurality of individual loops fabricated from Cu, BeCu or other electrically conductive material, and are formed around the semicircular sections 50 and 52 of pole member 44. In the embodiment shown, the first ends of coils 46 and 48 adjacent to the ends 54 and 58, respectively, of pole member 44 are both electrically connected to a common lead 61. The second end of coil 46 is connected to lead 62, while the second end of coil 48 is connected to lead 64. Although not shown, leads 61, 62 and 64 extend along the length of suspension 8 (or are connected to lead wires which extend along the suspension) and are connected to receive tracking drive signals from a tracking servo system.

As noted above, suspension 8 is configured to have a slider with a read/write head (not shown) adhesively bonded or otherwise mounted to tongue 32 to form a head suspension assembly. The head suspension assembly is configured to be mounted to an actuator arm of a magnetic disk drive (not shown) to support the slider over the surface of a magnetic disk. Tracking control signals applied to leads 61, 62 and 64 cause the field-generating structure 40 to produce a magnetic field which exerts forces on moving pole member 42 to move flexure tongue 32 from its neutral position along a transverse tracking axis 70. Flexure 16 and microactuator 10 are positioned on the suspension 8 in such a manner that the motion along tracking axis 70 is generally perpendicular to the information tracks on the magnetic disk. In particular, tracking control signals are applied to leads 61 and 64 to energize coil 48 in such a manner as to create a magnetic field between stationary pole member ends 56 and 58. The magnetic field produced by coil 48 pulls the moving pole member 42 and tongue 32 toward the end 58 of stationary pole member 44. Similarly, tracking control signals are applied to leads 61 and 62 to energize coil 46 in such a manner as to pull the moving pole member 42 and flexure tongue 32 toward end 54 of stationary pole member 44.

Accordingly, microactuator 10 functions as a fine tracking actuator. In response to the tracking control signals, microactuator 10 drives and positions flexure tongue 32, and therefor the slider and read/write head mounted thereto, with respect to individual information tracks on the disk. The magnitude of the tracking control signals are controlled by the servo system to control the extent of motion the tongue 32 from its neutral position. The resilient nature of arms 28 and cross member 30 urges tongue 32 back to its neutral position when coils 46 and 48 are not energized.

Figure 3:
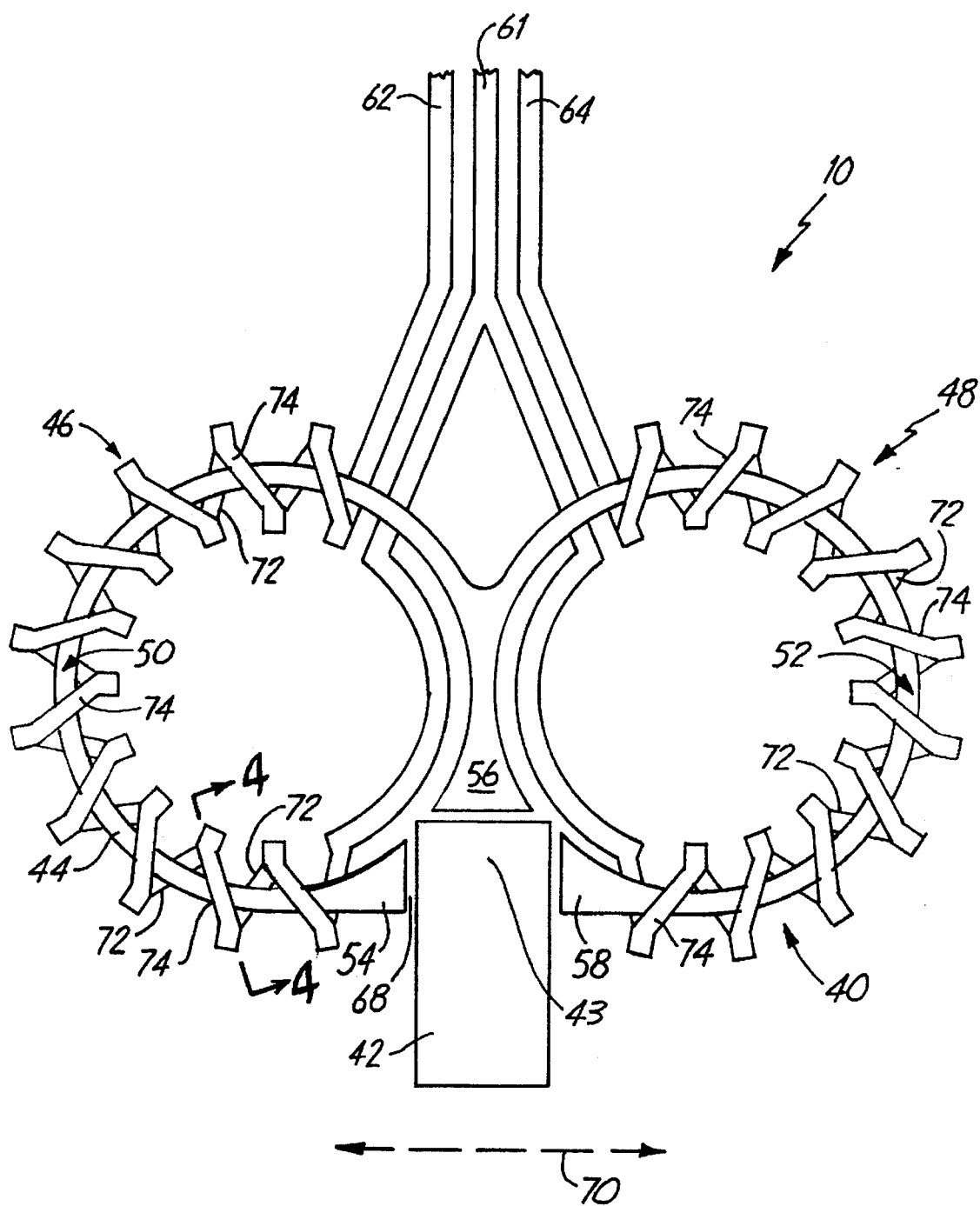
FIG. 3 is a detailed view of the microactuator shown in FIG. 1.
Figure 4:
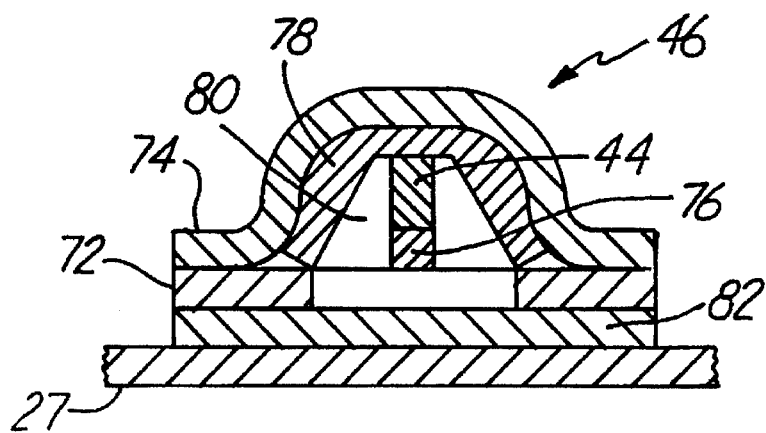
FIG. 4 is a sectional view of the microactuator shown in FIG. 3, taken along line 4—4.

As shown in FIGS. 3 and 4, each loop or turn of coils 46 and 48 includes a generally flat lower loop portion 72 that extends under the pole member 44, and an inverted generally "U"-shaped upper loop portion 74 that extends over the pole member. The opposite ends of each upper loop portion 74 are electrically interconnected to the associated ends of the adjacent lower loop portions 72. Pole member 44 is spaced and electrically isolated from lower loop portions 72 by a lower dielectric or insulating member 76. In the embodiment shown, the lower insulating member 76 is formed to the same shape as pole member 44. The insulating member 76 can be fabricated from polyimide or other dielectric material having appropriate dielectric characteristics. Pole member 44 is also spaced and electrically isolated from upper loop portions 74 by upper insulating members 78 which can be fabricated from the same dielectric material as lower insulating member 76. The interior surfaces of upper insulating members 78 are spaced from the sides of pole member 44 and lower insulating member 76 to form air gaps 80. As described below, coils 46 and 48 can be formed as low-profile members on the upper surface of the mounting portion 27 of flexure 16. Dielectric or insulating layer 82 separates the coils 46 and 48 and leads 61, 62 and 64 from the surface of flexure 16.

Figure 5:
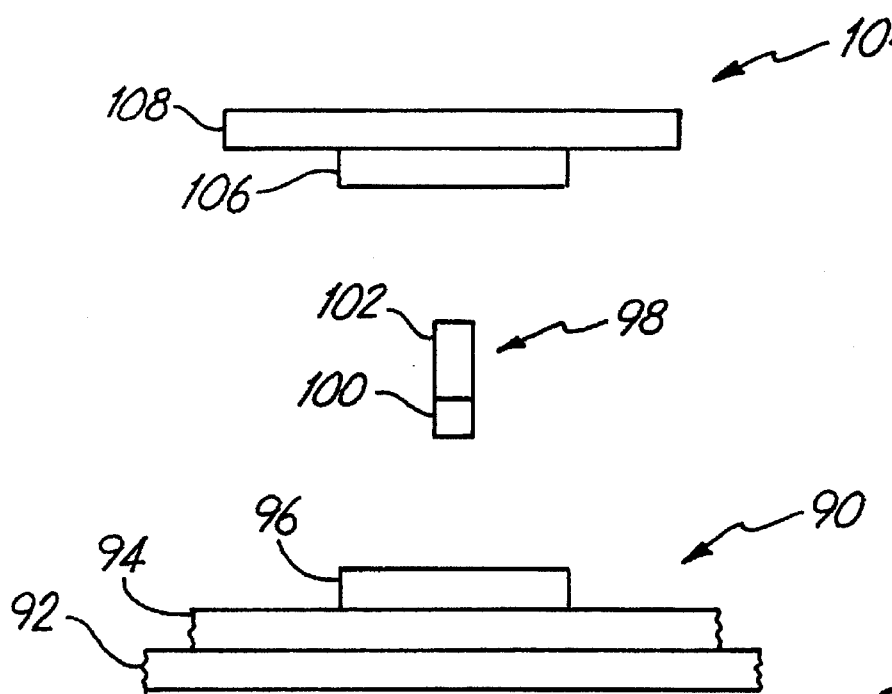
FIG. 5 is an illustration of laminated sheet of material from which the flexure shown in FIG. 1 can be fabricated.

A method for fabricating flexure 16 and microactuator 10 can be described with reference to FIGS. 3–5. In this embodiment, the mounting portion 27, arms 28, cross member 30, tongue 32, insulating layer 82, lower loop portions 72 of coils 46 and 48 and leads 61, 62 and 64 are fabricated and formed from a laminated sheet of material such as 90 which is illustrated generally in FIG. 5. Sheet 90 includes a lower layer 92 of stainless steel (i.e., the resilient structural material from which the flexure is fabricated), an intermediate layer 94 of polyimide or other dielectric material overlaying the lower layer, and an upper layer 96 of Cu or BeCu or other conductor overlaying the intermediate layer. Using conventional or otherwise known techniques, blanks having the desired external dimensions of flexure 16 are cut from the sheet of material 90, and the lower layer 92 patterned and etched to form mounting portion 27, arms 28, cross member 30 and tongue 32. Intermediate layer 94 and upper layer 96 are then patterned and etched to form the insulating layer 82, lower loop portions 72 and leads 61, 62 and 64 on mounting portion 27. Cross member 30 can then be formed, again in a conventional manner, to offset the plane of tongue 32 from the plane of arms 28 to provide gimbaling clearance for a slider mounted to the tongue.

Moving pole member 42 and associated spacing member (if any), stationary pole member 44 and lower insulating member 76 can be formed or etched in a similar manner from a laminated sheet of material such as 98 which includes a lower layer 100 of polyimide or other dielectric material, and an upper layer 102 of NiFe or other relatively high permeability material overlaying the lower layer. Upper loop portions 74 and insulating members 78 can be formed by etching a sheet of laminated material such as 104 which includes a lower layer 106 of polyimide or other dielectric material, and an upper layer 108 of Cu, BeCu or other conductor overlaying the lower layer. After appropriately sized elements are etched from the sheet 104, the elements can be formed using conventional techniques (e.g., a die or press) into the appropriate shape. Using tabbing techniques to assure proper alignment or registration, the formed and etched sheet 98 can be bonded by adhesive or otherwise mounted to the formed and etched sheet 90. Similarly, the formed and etched sheet 104 is aligned with and mounted to the sheets 90 and 98. The opposite ends of each upper loop portion 74 are then soldered to the associated ends of the lower loop portions 72 by sweat-soldering or other conventional techniques. Final forming and detabbing operations are then performed to complete the fabrication of the flexures 16 with microactuators 10. Flexure 16 is welded or otherwise mounted to the distal end of load beam 12 to complete the fabrication of suspension 8.

Figure 6:
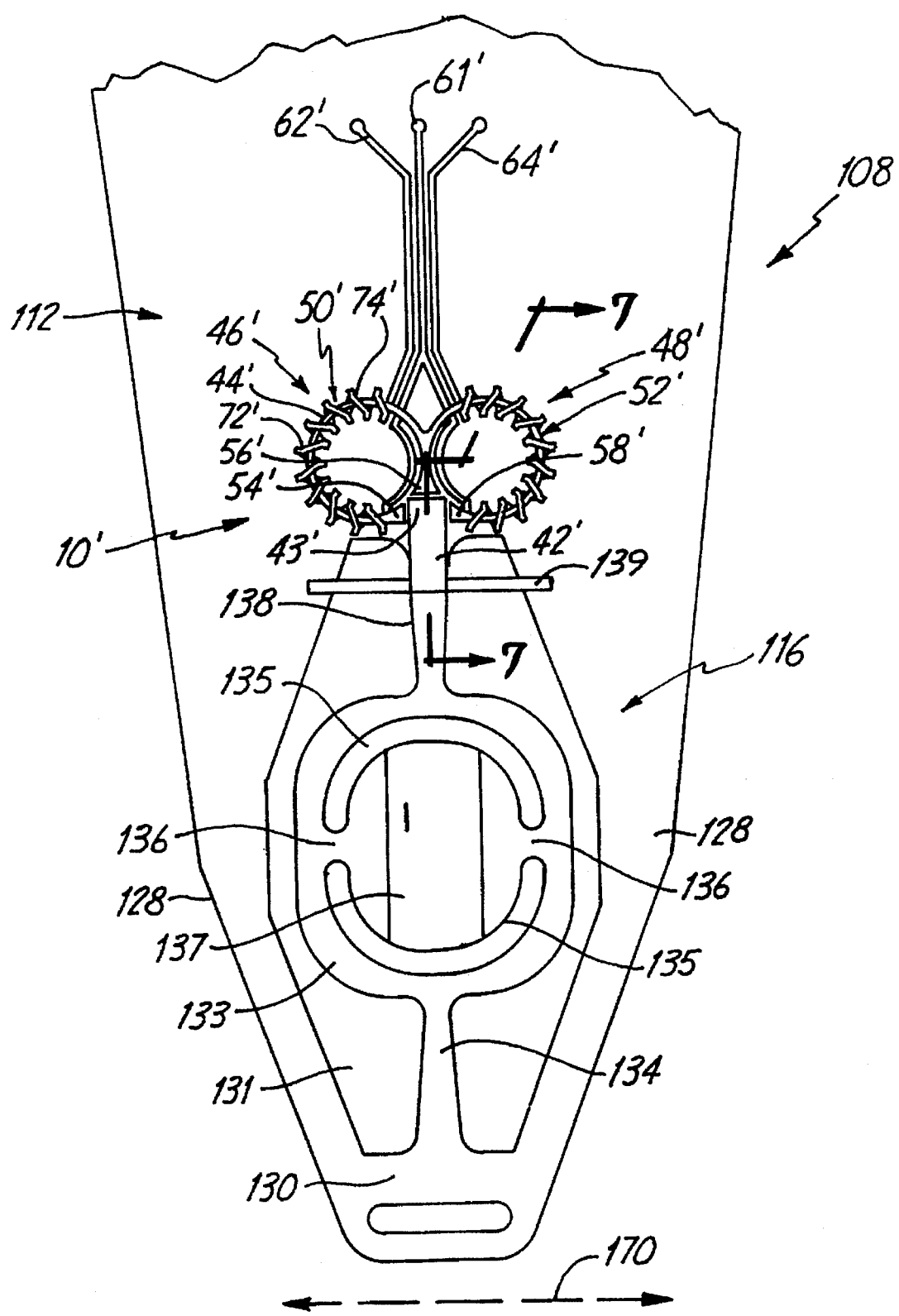
FIG. 6 is an illustration of a suspension with an integrated gimbal-type flexure and including a tracking microactuator in accordance with the present invention.
Figure 7:
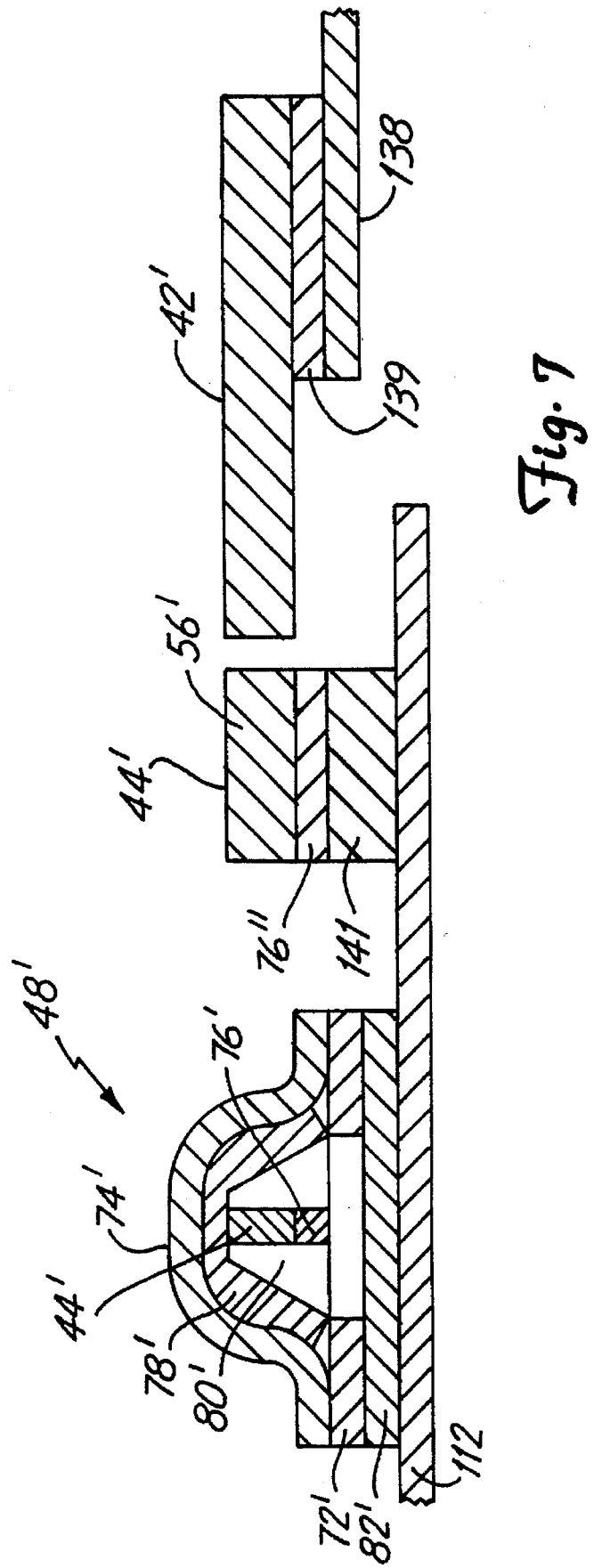
FIG. 7 is a sectional view of the microactuator shown in FIG. 6, taken along line 7—7.

FIGS. 6 and 7 are illustrations of the distal end of a suspension 108 including an integrated gimbal 116 (i.e., a gimbal-type flexure) and a tracking microactuator 10' in accordance with a second embodiment of the present invention. Gimbal 116 is formed from the same piece of stainless steel or other material forming load beam 112. As shown, load beam 112 includes a pair of outer members 128 which are joined at the tip 130 of suspension 108 to form an aperture 131. Gimbal 116 includes an outer ring 133 supported within aperture 131 by a first roll axis arm 134 which extends between the ring and tip 130. The gimbal 116 also includes a pair of semicircular slots 135, each of which has ends spaced from the ends of the other slot to form a pair of pitch axis arms 136. Arms 136 support a slider bonding pad 137 from ring 133. A second roll axis arm 138 extends toward microactuator 10' from the side of ring 133 opposite the first roll axis arm 134. A bridge support member 139 is fixedly mounted to the roll axis arm 138. Bridge support member 139 is oriented generally transverse to the roll axis arm, and extends across gap 131. The ends of bridge support member 139 are bonded or otherwise mounted to members 128. Bridge support member 139 is fabricated from polyimide or other flexible material, and thereby supports the gimbal 116 with respect to the load beam 112 while allowing the gimbal to be moved along tracking axis 170 by microactuator 10'.

Microactuator 10' can be identical to microactuator 10 described above with reference to FIGS. 1–6, but is mounted directly on load beam 112 rather than on a separate flexure such as 16. Accordingly, features and components of microactuator 10' that are structurally and/or functionally the same as corresponding features and components of microactuator 10 are identified with identical but primed reference numerals (i.e., x') in FIGS. 6 and 7. Suspension 108 can also be fabricated in a manner similar to that of suspension 8 and described above. In particular, load beam 112, gimbal 116, insulating layer 82', lower loop portions 72' and leads 61', 62' and 64' can all be etched and formed from a laminated sheet of material such as that shown at 90 in FIG. 5. Stationary pole member 44', lower insulating member 76', moving pole member 42' and bridging support member 139 can be etched and formed from a laminated sheet of material such as than shown at 98 in FIG. 5. Upper loop portions 74' of coils 46' and 48' and insulating members 78' can be etched and formed from a laminated sheet of material such as that shown at 104 in FIG. 5. These three formed sheets of material are then assembled and finished in a manner similar to that described above with reference to suspension 8 to complete the suspension 108. As shown in FIG. 7, suspension 108 also includes a spacer 141 to position stationary pole member 44' at the same height as moving pole member 42' for efficient magnetic coupling. Spacer 141 can be etched from the stainless steel from which load beam 112 is formed.

Figure 8:
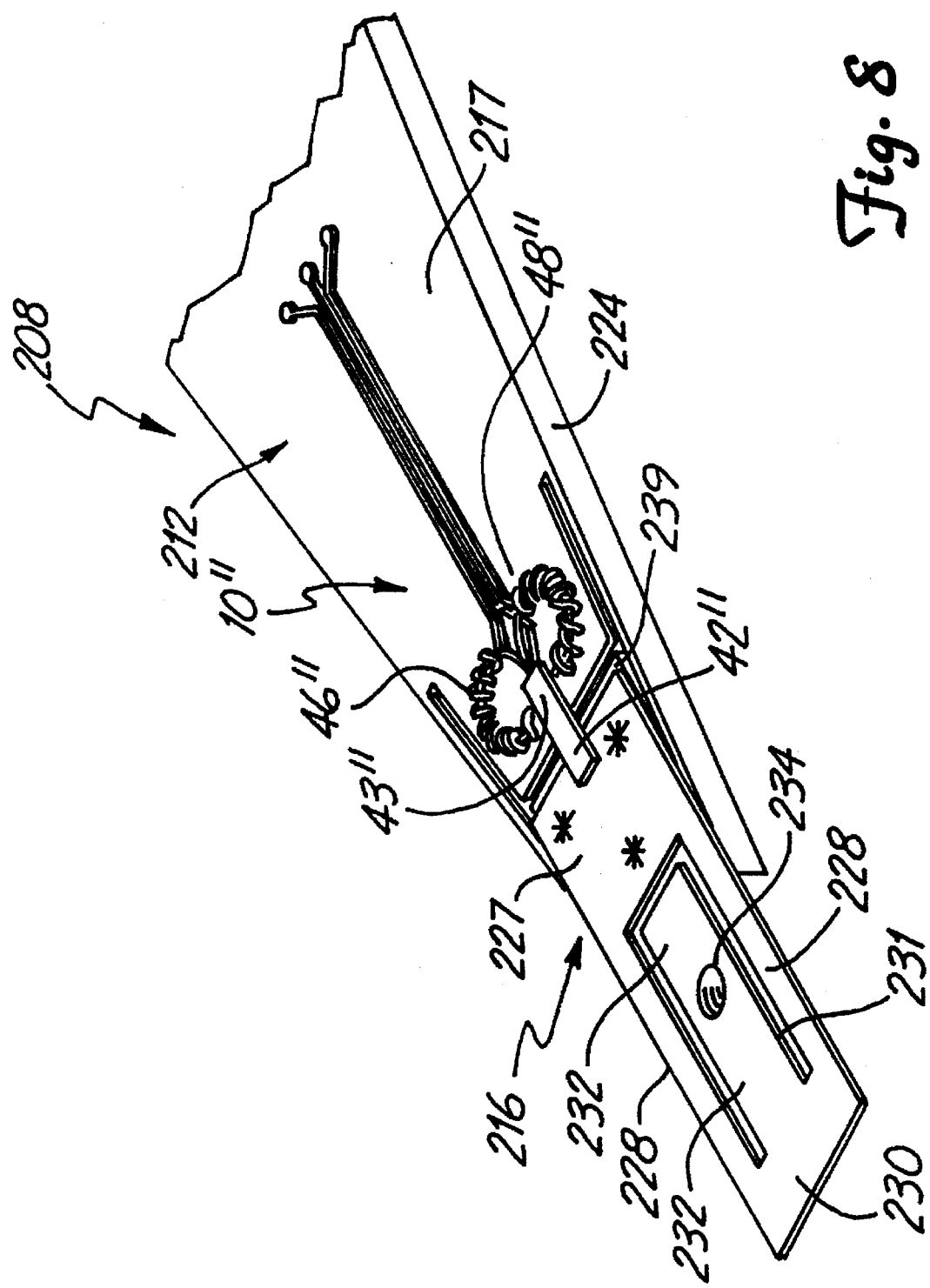
FIG. 8 is an illustration of a suspension having a laterally movable tip and including a tracking microactuator in accordance with the present invention.
Figure 9:
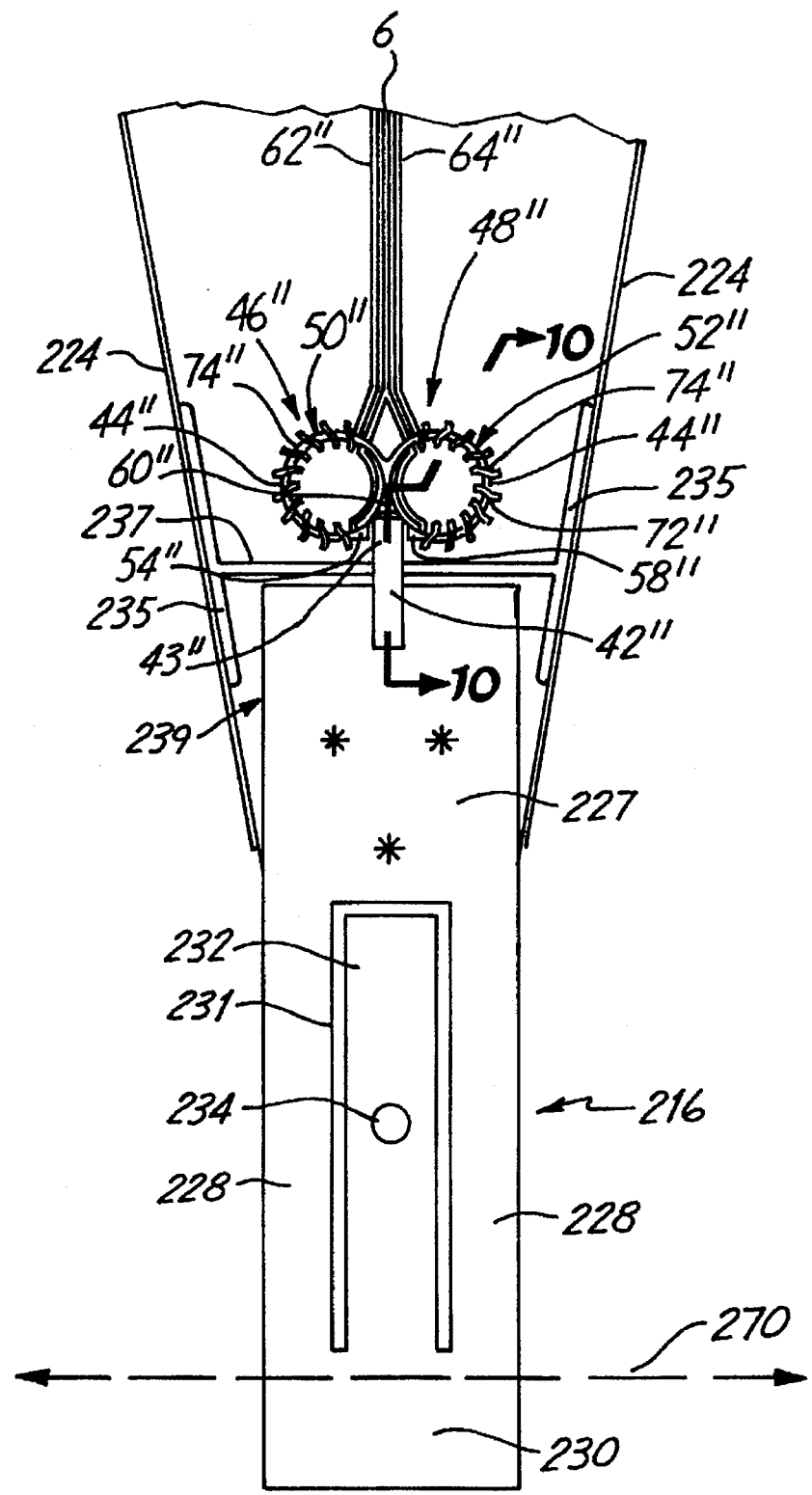
FIG. 9 is a detailed view of the tip of the suspension shown in FIG. 8.
Figure 10:
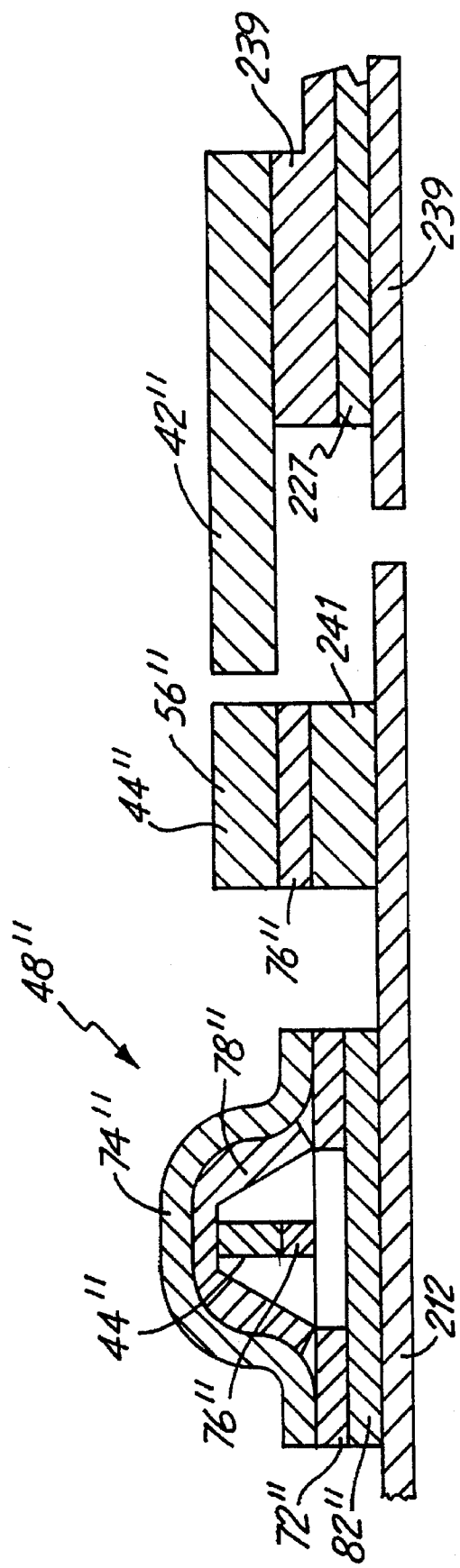
FIG. 10 is a sectional view of the microactuator shown in FIG. 9, taken along line 10—10.

FIGS. 8, 9 and 10 are illustrations of the distal end of a suspension 208 including a tracking microactuator 10" in accordance with a third embodiment of the present invention. Suspension 208 includes a load beam 212 having a rigid region 217. A pair of flanges or rails 224 are formed in the opposite sides of the load beam 212 along the length of the rigid region 217. Flexure 216 is fabricated and formed separately from load beam 212, and is welded or otherwise mounted to the load beam during the manufacture of suspension 208. This flexure 216 includes a mounting portion 227, a pair of spaced arms 228 which extend from the mounting portion, and a cross member 230 which extends between the distal ends of the arms. The arms 228 and cross member 230 form a gap 231 through the distal end of flexure 216. A tongue 232 extends from the cross member 230 into gap 231 toward the load beam base (not visible in FIGS. 8–10). Tongue 232 also includes a conventional load point dimple 234. In alternative embodiments (not shown) the load point dimple is formed on load beam 212.

A pair of elongated slots 235 are formed on opposite sides of the rigid region 217 of load beam 212, adjacent to the rails 224. As shown, the slots 235 are located near the distal end of load beam 212, but the distal ends of the slots are terminated short of the distal end of the load beam. A transverse slot 237 which extends between slots 235 is also formed in the rigid region 217 of load beam 212. Slots 235 and 237 form a flexure mounting region 239 on the distal end of load beam 217. The flexure mounting region 239 is attached to the remaining portions of the load beam 217 by rails 224. Mounting portion 227 of flexure 216 is welded or otherwise mounted to the mounting region 239 of load beam 212 with the tongue 232 extending beyond the distal end of the load beam. Rails 224 in the regions of slots 235 provide a relatively rigid support between the flexure mounting region 239 and remaining portions of the load beam 212 with respect to relative motion along an axis normal to the plane of the load beam, while providing sufficient resilient flexibility to allow microactuator 10" to move the mounting region with respect to the remaining load beam portions along a tracking axis 270.

Microactuator 10" can be identical to microactuator 10 described above with reference to FIGS. 1–5, but is mounted directly on load beam 212 adjacent to mounting portion 239 rather than on a separate flexure such as 16. Accordingly, features and components of microactuator 10" that are structurally and/or functionally the same as corresponding features and components of microactuator 10 are identified with identical but primed reference numerals (i.e., x') in FIGS. 8–10. Suspension 208 can also be fabricated in a manner similar to that of suspension 8 and described above. In particular, load beam 212, insulating layer 82" lower loop portions 72" and leads 61", 62" and 64" can all be etched and formed from a laminated sheet of material such as that shown at 90 in FIG. 5. Flexure 216 can also be etched and formed from a laminated sheet of material such as that shown at 90 in FIG. 5. Fixed pole member 44", lower insulating member 76", moving pole member 42" and a dielectric member 239 below the moving pole member can be etched and formed from a laminated sheet of material such as than shown at 98 in FIG. 5. Upper loop portions 74" of coils 46" and 48" and insulating members 78" can be etched and formed from a laminated sheet of material such as that shown at 104 in FIG. 5. Stationary pole member 44" is also spaced form the surface of load beam 212 by spacer 241 in the embodiment shown in FIG. 10. These three formed sheets of material are then assembled and finished in a manner similar to that described above with reference to suspension 8 to complete the suspension 208.

Suspensions including tracking microactuators in accordance with the present invention offer considerable advantages. The microactuator is relatively lightweight and will not substantially impair the resonance characteristics of the suspension. Furthermore, since the bulk of the microactuator (i.e., the field-producing structure) is located on the load beam rather than the moving portion of the flexure, the moving portion of the flexure does not have to be redesigned with additional support to accommodate the microactuator.

No lead wires have to extend across the gap to the moving portion of the flexure, so the static attitude characteristics of the flexure are unaffected by the microactuator. The microactuator is reliable, has a relatively low profile and is relatively efficient to fabricate.

Although the present invention has been described with reference to preferred embodiments, those skilled in the art will recognize that changes can be made in form and detail without departing from the spirit and scope of the invention.

What is claimed is:

1. A disk drive suspension, including:
   a load beam having a rigid region, proximal and distal ends, and a spring region between the proximal end and the rigid region;
   a mounting region on the proximal end of the load beam;
   a flexure on the distal end of the load beam, the flexure configured for receiving and supporting a read/write head; and
   a microactuator on the rigid region of the load beam, the microactuator responsive to tracking control signals for moving the flexure along a tracking axis with respect to the rigid region.

2. The disk drive suspension of claim 1 wherein the microactuator includes an electromagnetic microactuator.

3. The disk drive suspension of claim 2 wherein the microactuator includes a pair of coils which generate magnetic fields in response to tracking drive signals, and cause the flexure to move along the tracking axis.

4. The disk drive suspension of claim 2 wherein the microactuator includes at least two magnetic field generating structures, at least portions of which are laterally spaced from one-another, and which are responsive to tracking drive signals for moving the flexure along the tracking axis.

5. The disk drive suspension of claim 2 wherein the microactuator includes at least two magnetic coils, at least portions of which are laterally spaced from one-another and positioned on the rigid region of the load beam with at least one of the coils fixedly mounted to the rigid region, the coils further being responsive to tracking drive signals for moving the flexure along the tracking axis.

6. The disk drive suspension of claim 2 wherein:
   the load beam further includes one or more linkage arms for supporting a distal section of the load beam including the flexure for movement along the tracking axis with respect to the rigid region; and
   the microactuator includes at least two coils, at least one of which is fixedly mounted to the rigid region of the load beam for generating magnetic fields in response to tracking drive signals and causing the distal end of the load beam including the flexure to move along the tracking axis.

7. The disk drive suspension of claim 2 wherein the microactuator includes:
   a moving pole member on the flexure;
   at least one coil mounted to the rigid region of the load beam and adjacent to the moving pole member, for creating electromagnetic forces which act on the moving pole member to move the flexure along the tracking axis; and
   a stationary pole member within each of the coils and having ends forming a gap adjacent to the moving pole member.

8. The disk drive suspension of claim 7 wherein the microactuator includes a pair of coils having a stationary pole member, the coils mounted to the rigid region of the load beam on opposite sides of the moving pole member.

9. The disk drive suspension of claim 7 wherein the moving pole member and the stationary pole member are positioned at a same perpendicular distance above the rigid region.

10. The disk drive suspension of claim 7 wherein each of the coils comprises a plurality of interconnected loops including:
    a lower loop member; and
    an upper loop member having ends electrically interconnected to adjacent lower loop members.

11. The disk drive suspension of claim 10 wherein the microactuator further includes:
    a stationary pole member within the coils and having ends forming a gap adjacent to the moving pole member;
    a lower layer of dielectric material separating the stationary pole member from the lower loop members of the coils; and
    an upper layer of dielectric material separating the stationary pole member from the upper loop members of the coils.

12. The disk drive suspension of claim 11 wherein the upper loop members of the coils are U-shaped members.

13. The disk drive suspension of claim 11 and further including a layer of dielectric material between the rigid portion of the load beam and the lower loop members of the coils.

14. The disk drive suspension of claim 7 wherein:
    the flexure comprises a T-flexure including a tongue having a free end extending toward the rigid region of the load beam;
    the moving pole member is mounted to the free end of the tongue; and
    the coils are mounted to the load beam adjacent to the moving pole member.

15. The disk drive suspension of claim 7 wherein:
    the load beam further includes one or more arms for movably supporting a distal section of the load beam including the flexure from the rigid region;
    the moving pole member is mounted to the distal section of the load beam; and
    the coils of the microactuator are mounted to the rigid region of the load beam adjacent to the moving pole member.

16. The disk drive suspension of claim 7 wherein:
    the flexure includes a gimbal;
    the moving pole member is mounted to the gimbal; and
    the coils are mounted to the load beam adjacent to the moving pole member.

17. A magnetic disk drive suspension, including:
    a load beam having a rigid region, proximal and distal ends, and a spring region between the proximal end and the rigid region;
    a mounting region on the proximal end of the load beam;
    a flexure at a distal end of the rigid region of the load beam, the flexure configured for receiving and supporting a magnetic read/write head; and
    an electromagnetic microactuator including at least two coils on the rigid region of the load beam, the coils generating magnetic fields in response to tracking control signals and causing the flexure to move along a tracking axis with respect to the rigid region.

18. The disk drive suspension of claim 17 wherein the load beam further includes one or more linkage arms for supporting a distal section of the load beam including the flexure for movement along the tracking axis with respect to the rigid region.

* * * * *